US 12,426,545 B2

(12) United States Patent
Schiewer et al.

(10) Patent No.: US 12,426,545 B2
(45) Date of Patent: Sep. 30, 2025

(54) DRIVE SYSTEM FOR A SELF-PROPELLING HARVESTER

(71) Applicant: CLAAS Selbstfahrende Erntemaschinen GmbH, Harsewinkel (DE)

(72) Inventors: Stefan Schiewer, Warendorf (DE); Malte Lütkeschümer, Osnabrück (DE); Maik Poppenborg, Marienfeld (DE); Mathias Graute, Münster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1164 days.

(21) Appl. No.: 17/238,692

(22) Filed: Apr. 23, 2021

(65) Prior Publication Data

US 2021/0337735 A1  Nov. 4, 2021

(30) Foreign Application Priority Data

May 4, 2020 (DE) .......................... 102020111993.3

(51) Int. Cl.
*A01D 69/06* (2006.01)
*A01D 43/08* (2006.01)

(52) U.S. Cl.
CPC ............. *A01D 69/06* (2013.01); *A01D 43/08* (2013.01)

(58) Field of Classification Search
CPC ........ A01D 69/00–69/12; A01D 41/00–41/16; A01D 69/06; A01D 43/08; A01F 29/00–29/22
See application file for complete search history.

(56) References Cited

U.S. PATENT DOCUMENTS

| 9,635,812 B2 | 5/2017 | Schiewer et al. |
| 2010/0011727 A1* | 1/2010 | Rauschenbach ........ A01F 29/14 |
| | | 56/11.8 |

(Continued)

FOREIGN PATENT DOCUMENTS

| DE | 10036612 A1 | 2/2002 |
| DE | 102006030971 A1 * | 1/2008 ........... A01D 43/085 |

(Continued)

OTHER PUBLICATIONS

European Search Report issued in related application No. EP 21156543.0, mailed Aug. 18, 2021 (5 pages).

(Continued)

*Primary Examiner* — Joseph M Rocca
*Assistant Examiner* — Madeline I Runco
(74) *Attorney, Agent, or Firm* — Lempia Summerfield Katz LLC

(57) ABSTRACT

A drive system for self-propelling harvester is disclosed. The harvester includes a drive motor, a transfer case driven by the drive motor and having an output pulley arranged on a driveshaft of the transfer case and driving, using a main drive belt, at least one main pulley of a rotating cutter drum arranged on the end of a cutter drum shaft, a conditioning apparatus, an ejection accelerator, and a hydraulic pump for hydraulically driving an attachment and/or a feed device. The output pulley, the main drive belt and the main pulley form a main drivetrain for driving the cutter drum, the conditioning apparatus, and the ejection accelerator, and the attachment and the feed device are each driven by a separate drivetrain. At least one prop shaft, on the side of the main drivetrain, is arranged or positioned to lie in a common vertical plane with the main drive belt.

17 Claims, 6 Drawing Sheets

(56) References Cited

U.S. PATENT DOCUMENTS

2015/0351324 A1* 12/2015 Schiewer .............. A01D 69/06
                                                             74/720
2017/0273243 A1   9/2017 Bailliu et al.

FOREIGN PATENT DOCUMENTS

| DE | 102009028094 A1 | 2/2010 |
| DE | 102014108026 A1 | 12/2015 |
| DE | 102014219049 A1 | 3/2016 |
| DE | 102015107092 A1 | 11/2016 |
| EP | 1875793 A1 * | 1/2008 | ........... A01D 43/085 |
| EP | 3228175 A1 | 10/2017 |

OTHER PUBLICATIONS

YouTube: "John Deere 9000 Series Animation Driveline", Feb. 28, 2019 https://www.youtube.com/watch?v=5DvR0hXksf0 (pp. 1-5) (including image screenshots 1a-1d).
T. Bensing, G. Eikei, John Deere 9000 forage harvester series, magazine Professional Nov. 2018 (pp. 1-12).
"9000 Series Pure Performance, John Deere" imprint YYI 814480MAS_GB Oct. 2018 (pp. 1-52).
Jaguar 870 860 850 840 CLAAS (Imprint: 202011011115 KK KP 1115/00 02488191) Nov. 2015. jaguar800.class.com (pp. 1-164).
M. Mumme, "John Deere 9800i" Traction Magazine p. 48 ff, Nov./Dec. 2018 www.traction-magazin.de (pp. 1-14).
Photos Deere & Company Model 8600 forage harvester manufactured and delivered in the Year 2018. (pp. 1-6).

* cited by examiner

DRIVE SYSTEM FOR A SELF-PROPELLING HARVESTER

CROSS REFERENCE TO RELATED APPLICATION

This application claims priority under 35 U.S.C. § 119 to German Patent Application No. DE 102020111993.3 filed May 4, 2020, the entire disclosure of which is hereby incorporated by reference herein.

TECHNICAL FIELD

The present application relates to a drive system for a self-propelling harvester, such as a forage harvester.

BACKGROUND

The tendency toward ever-larger machine widths in agriculture has led to the working units of self-propelling harvesters, such as forage harvesters, being designed for ever-larger harvested material throughputs. By using a folding attachment such as a corn header, the width of a forage harvester when used in the field can exceed its width by several times when driving on a public traffic route. The amount of harvested material that can be cut and picked up per unit time increases proportional to the width of the attachment. The width of the work assemblies cannot be increased to the same extent since it is limited by the width of the body of the forage harvester, and an excessively wide forage harvester would not be able to be driven in public road traffic.

U.S. Pat. No. 9,635,812, incorporated by reference herein in its entirety, discloses a drive system for a self-propelling harvester. The drive system includes a drive motor, a transfer case driven by the drive motor and having a first output pulley that is arranged or positioned on a driveshaft and drives, using a main drive belt, at least one main pulley of a rotating cutter drum arranged or positioned on the end of a cutter drum shaft, a conditioning apparatus, an ejection accelerator and at least one hydraulic pump driven by the drive motor for driving an attachment and a feed device. On the driveshaft, the transfer case is assigned a second output pulley that drives the at least one hydraulic pump using the second drive belt. The second output pulley for driving the hydraulic pump is arranged or positioned parallel to the first output pulley of the transfer case. The main drive belt and the second drive belt run parallel to each other on one side of the machine. Moreover, prop shafts are arranged or positioned on the same side of the drive system parallel to the main drive belt to drive the attachment and feed device.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
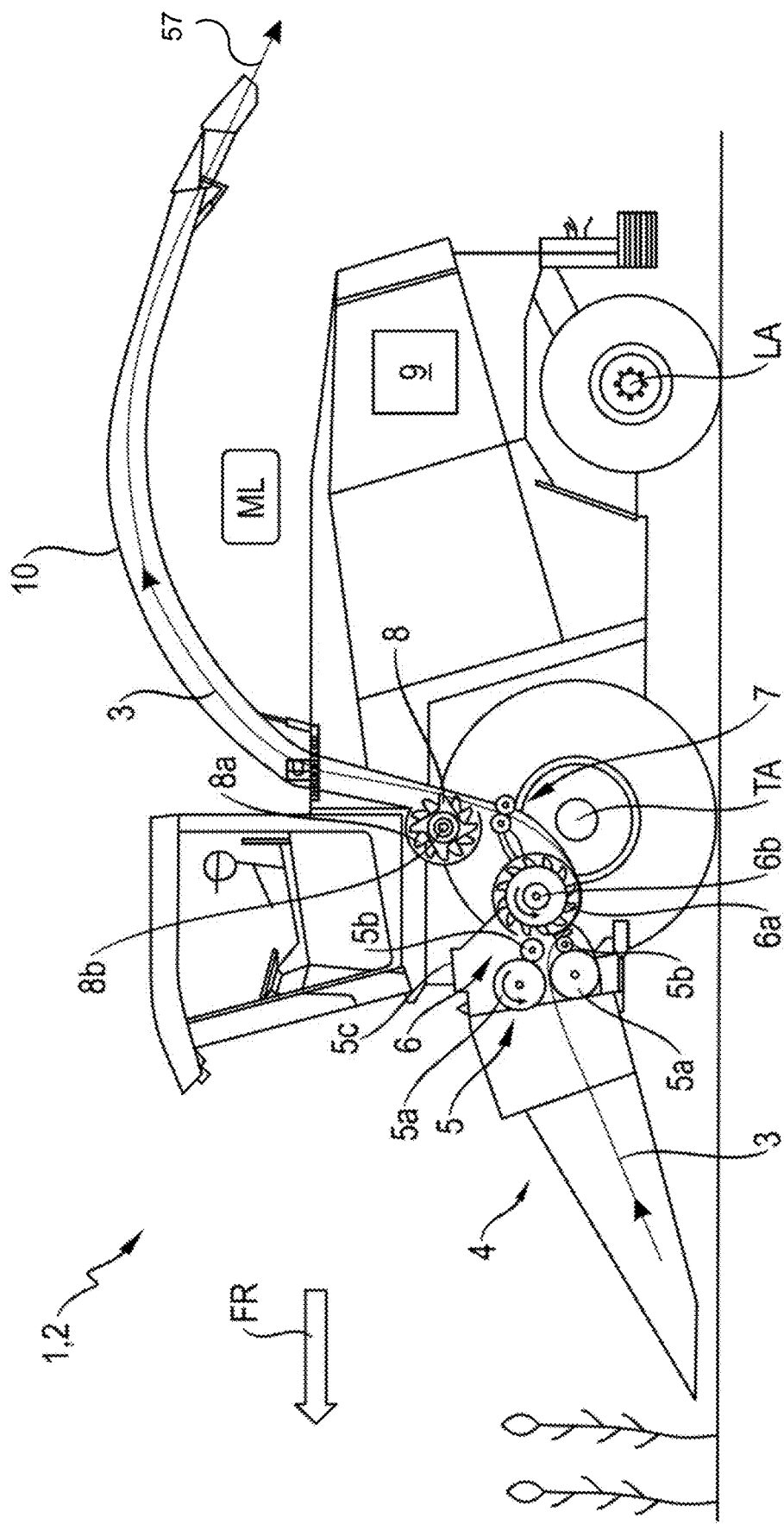
FIG. 1 shows a schematic view of a self-propelling harvester designed as a forage harvester.

As discussed in the background, the arrangement of the power-transmitting assemblies, such as in U.S. Pat. No. 9,635,812, may restrict the working width of the material-processing working units (e.g., the feed device with its prepressing rollers and feed rollers, as well as the downstream cutter drum). Consequently, there may be less installation space available for the elements of the drive system over the width of the harvester since the machine width cannot be increased further due to road traffic regulations.

In this regard, a drive system of the aforementioned type is designed more compactly and, in so doing, is configured to drive a wide range of attachments in different operating modes, including a reversing function.

Thus, in one or some embodiments, a drive system for a self-propelling harvester is disclosed, wherein the drive system includes a drive motor, a transfer case driven by the drive motor and having an output pulley that is arranged or positioned on a driveshaft of the transfer case and drives, using a main drive belt, at least one main pulley of a rotating cutter drum arranged or positioned on the end of a cutter drum shaft, a conditioning apparatus, and an ejection accelerator, and at least one hydraulic pump driven by the drive motor for hydraulically driving an attachment and/or a feed device. According to one or some embodiments, the output pulley, the main drive belt, and the main pulley form a main drivetrain for driving the cutter drum, the conditioning apparatus, and the ejection accelerator, and the attachment and the feed device are each driven by a separate drivetrain, wherein at least one prop shaft arranged or positioned on the side of the main drivetrain is arranged or positioned to lie in a common vertical plane with the main drive belt. The common plane may extend in the vertical direction of the harvester.

Given such a dispersed drive system, the necessary installation space requirement is reduced so that the working width of the material-processing working units can be enlarged. The dispersed drive system according to one or some embodiments may be better integrated in the open spaces reduced by widening the working units in that the main drive belt and the at least one prop shaft assigned to the machine side of the harvester are arranged or positioned superimposed in a plane and not next to each other as taught in the prior art.

According to one or some embodiments, the separate drivetrain for driving the attachment can be arranged or positioned to lie at least partly (or entirely) in the common vertical plane with the main drive belt.

In so doing, the separate drivetrains for driving the attachment and/or the feed device may be arranged or positioned to lie substantially within the belt width of the main drive belt. The arrangement of the separate drivetrains substantially within the belt width of the main drive belt frees up installation space relative to the overall width of the harvester or the forage harvester, which, in turn, allows the working width of the working units to be expanded.

In particular, the at least one separate drivetrain (which may comprise or consist of a single separate drivetrain) for driving the attachment may be arranged or positioned to lie underneath the main drive belt, and the at least one separate drivetrain (which may comprise or consist of a single separate drivetrain) for driving the feed device may be arranged or positioned to lie above the main drive belt. Given the arrangement outside of the looping of the output pulley and main pulley, an overlapping or crossing of the main drivetrain and the two separate drivetrains located on the same side may be avoided.

In one or some embodiments, the separate drivetrain for driving the attachment may be arranged or positioned to lie axially parallel to a drive axle of the harvester, such as underneath or above the drive axle, or at least extending sectionally through an axle beam of the drive axle. This may result in an improved use of installation space of the working units located above the drive axle and the main drivetrain located above the drive axle. In particular, a crossing or overlapping arrangement of the separate drivetrain of the attachment with the main drivetrain may be avoided.

Alternatively, the separate drivetrain for driving the attachment may include a gearbox clutch unit that is assigned to the cutter drum shaft on the side opposite the main pulley, wherein the gearbox clutch unit may be configured to hydraulically drive the attachment with power summing with an stepless variable rotational speed, or with a discrete transmission, wherein the gearbox clutch unit drives a transverse shaft running axially parallel to the cutter drum shaft, and the transverse shaft is drivingly connected to a clutch apparatus located on the side of the main pulley to drive the attachment. In a first shift position of the gearbox clutch unit, the drive of the attachment may be driven purely hydraulically in a stepless manner. In a second shift position of the gearbox clutch unit, the attachment may be driven with power summing with a discrete transmission (e.g., hydraulically and also mechanically with power summing).

To accomplish this, the gearbox clutch unit may have a gear assembly and a drive pulley with a clutch integrated in the drive pulley. With the gear assembly, the rotational speed of the at least one hydraulic motor may be transformed or adjusted so that the hydraulic motor works within an efficient operating range. In one or some embodiments, the drive pulley may be designed as a V-belt pulley.

In one or some embodiments, the gear assembly may be designed as a spur gear and/or angular spur gear, and the clutch may be designed as friction clutch or as a positive clutch. The clutch of the gearbox clutch unit designed as a friction clutch may be a single plate dry clutch. The clutch may have a first clutch part that is frictionally connected to the cutter drum shaft, and a second clutch part that may move relative to the cutter drum shaft and may be frictionally engaged with the drive pulley.

It may be particularly advantageous when the gear assembly is mounted on the cutter drum shaft. In particular, by rotatably mounting the gear assembly on the cutter drum shaft, a change in angle or length (when the attachment is swung that would otherwise have to be accommodated in hose lines or a prop shaft) may be avoided.

Moreover, an output pulley may be arranged or positioned on the end of the transverse shaft and may be connected by a belt to the drive pulley of the gearbox clutch unit. In so doing, the belt may be pretensioned by a tensioning device with a changeable or adjustable tension. In particular, the tensioning device may include a cylinder that may be pneumatically actuated using an actuator such as a hydraulic cylinder, or a spring with a belt tensioner to which force may be applied.

The gearbox clutch unit may be operated in a mode with a variable rotational speed in which the clutch is open so that the attachment is driven by the at least one hydraulic motor. This allows the attachment to be driven with a variable rotational speed.

Moreover, the gearbox clutch unit may be operated in a power summing mode in which the clutch is closed so that the attachment is mechanically driven by the cutter drum shaft and by the at least one hydraulic motor. In so doing, the power emitted by the hydraulic motor may be minimized to reduce the power loss. It is however also contemplated to decouple the hydraulic motor from the gearbox clutch unit for a purely mechanical drive of the attachment with a constant rotational speed when the clutch of the gearbox and clutch unit is closed.

Moreover, the gearbox clutch unit may be operated in a reverse mode in which the clutch is opened and the rotational direction of the at least one hydraulic motor is inverted. In this manner, problems with the flow of material within the feed device and/or the attachment may be overcome by driving them in reverse.

In so doing, a first pressure may be applied to the hydraulic cylinder of the tensioning device in the mode with a variable rotational speed and in the power summing mode, whereas a second pressure greater than the first pressure may be applied to the hydraulic cylinder in reverse mode or during a braking process in which the slack strand and tight strand of the drive belt change. In order to be able to transmit torque in reverse mode or during a braking process, the belt tensioner of the tensioning device is not pressed upward by the belt connecting the gearbox clutch unit to the output pulley of the transverse shaft.

Moreover, at least one hydraulic pump of one of the separate drivetrains may be connected directly to the main drivetrain in order to drive the at least one hydraulic pump. The at least one hydraulic pump may accordingly be connected permanently to the main drivetrain. This may bring about a braking of the main drive belt and the working units driven thereby. Hydraulically driving the gearbox clutch unit by the at least one hydraulic motor enables stepless driving of the attachment with a variable rotational speed.

Moreover, the above-stated object may be achieved by a self-propelling harvester, such as a forage harvester, with a drive system as described herein. The self-propelling harvester may have all of the features described in conjunction with the drive system disclosed herein, individually or in combination.

Referring to the figures, FIG. 1 illustrates a schematic view of a self-propelling harvester 1 designed as a forage harvester 2. The schematic representation, viewed in the driving direction FR, shows a view of the harvester 1 designated as the left machine side ML. The opposite side is correspondingly designated as the right machine side MR.

The forage harvester 2 harvests or collects plants from a field using an attachment 4 in order to then feed the collected harvested material 3, in the form of a harvested material stream (indicated in FIG. 1 as a line provided with arrows 57), through working units that are designed as processing and conveying units of the forage harvester 2 and, using a transfer apparatus, throw it into a loading container (not shown). The processing and conveying units of the forage harvester 2 include, inter alia, any one, any combination, or all of: a feed device 5; a chopping device 6; an optional conditioning apparatus 7; and an ejection accelerator 8.

The feed device 5 comprises (or consists of) one or more driven roller pairs 5a, 5b arranged or positioned sequentially in a feed housing 5c. The attachment 4 may be coupled to the feed device 5. The chopping device 6 includes a rotating cutter drum 6a equipped with blades through which the collected harvested material 3 is comminuted in cooperation with a shear bar. The cutter drum 6a is arranged or positioned on a driven cutter drum shaft 6b. The optional conditioning apparatus 7 is arranged or positioned in a conveying shaft downstream from the chopping device 6 in the conveying direction of the stream of material and may be removed as needed from the harvested material stream.

The ejection accelerator 8 is downstream from the conditioning apparatus 7 in the conveying shaft in the conveying direction of the stream of material and accelerates the harvested material 3 using rotating paddles for reliable ejection through the transfer apparatus 10, which is designed as a discharge chute. The ejection accelerator 8 includes conveying elements 8a arranged or positioned for conjoint rotation on a shaft 8b. A drive motor 9 designed as an internal combustion engine is arranged or positioned as a main drive assembly in the rear region of the forage harvester 2.

Different types of attachments may be used as an attachment 4 that can be coupled to the feed device 5 and may be selected depending on the type of harvested material to be processed. For example, a so-called pickup may be used on the forage harvester 2 to collect harvested material deposited in windrows. To harvest entire plants, a disk mower may be contrastingly used. When harvesting corn, a corn header that works independent of rows, or a corn picker that works independent of rows may be coupled to the feed device 5 of the forage harvester 2.

The aforementioned nonexclusive list of attachments 4 differ in terms of different operating specifications with respect to their drive. For example, the corn header or the pickup require a variable rotational drive speed, whereas the disk mower works with a constant rotational drive speed. Moreover, the power consumption of the disc mower may be greater than that of the pickup or the corn header.

Figure 2:
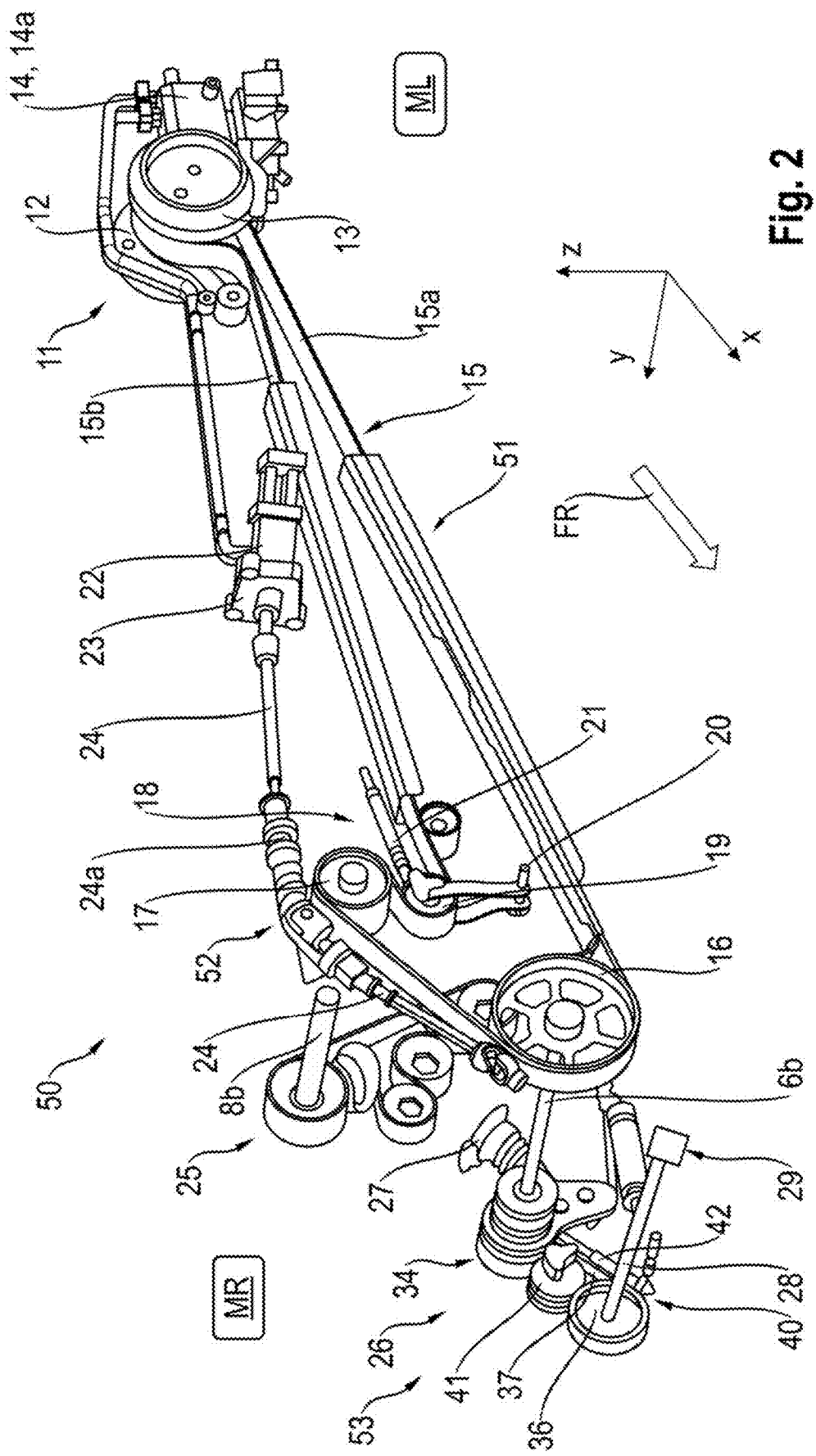
FIG. 2 shows a schematic, perspective view of a drive system for a self-propelling harvester.

FIG. 2 depicts a schematic, perspective view of a drive system 50 of the harvester 1 designed as a forage harvester 2 according to one or some embodiments. The depiction only shows the components of the drive system 50 that serve to transmit force to the different working units, the attachment 4, the feed device 5, the chopping device 6, the optional conditioning apparatus 7, and the ejection accelerator 8. The drive components of the feed device 5, the chopping device 6, and the ejection accelerator 8, which extend substantially in a longitudinal direction, are arranged or positioned on the left machine side ML. The drive components of the attachment 4 and the optional conditioning apparatus 7, which extend substantially in a longitudinal direction, are arranged or positioned opposite thereto on the right machine side MR. The feed device 5, chopping device 6, conditioning apparatus 7, and the ejection accelerator 8 that, inter alia, are not shown in FIG. 2, space the drive components from each other in the transverse direction y of the forage harvester 2. The above-described arrangement of the components of the drive system 50 may correspondingly also be mirror-inverted. x designates or denotes a longitudinal direction.

The drive motor 9 drives a transfer case 11 arranged or positioned on the left machine side ML using a motor shaft (not shown). The transfer case 11 includes an output pulley 12 that is arranged or positioned on a first driveshaft and is shiftably connected by a hydraulically actuatable coupling, such as clutch 13, to the motor shaft of the drive motor 9. Moreover, at least one hydraulic pump 14 is connected directly to the transfer case 11 on a second drive shaft of the transfer case 11.

Using a main drive belt 15, at least one main pulley 16 arranged or positioned on the end of the Cutter drum shaft 6b is driven by the output pulley 12. 15a designates the bottom side, and 15b designates the top side of the main drive belt 15. During regular operation, the bottom side 15a forms the tight strand or pulling strand, and the top side 15b forms the slack strand. The main drive belt 15 drives the ejection accelerator 8 by a pulley 17 arranged or positioned on the shaft 8b. Adjustable tension is applied to the top side 15b of the main drive belt 15 by a tensioning device 18 that includes a belt tensioner 19 that can pivot about an axle 20, as well as a hydraulic cylinder 21. The output pulley 12, the main drive belt 15, and the main pulley 16 form a main drivetrain 51 for driving the cutter drum 6a, the conditioning apparatus 7, and the ejection accelerator 8.

Moreover, a hydraulic motor 22 is arranged or positioned on the left machine side ML. The hydraulic motor 22 is arranged or positioned above the main drive belt 15 and lies substantially parallel thereto in a vertical plane. The common plane extends in the vertical direction z of the harvester 1. The hydraulic motor 22 is driven by the at least one hydraulic pump 14. A driveshaft of the hydraulic motor 22 drives a gearbox 23 that is connected by prop shafts 24 to the feed device 5 to be driven. A gearbox 24a may also be arranged or positioned between the prop shafts 24. The hydraulic motor 22 (and the gearbox 23 connected thereto) and the prop shafts 24 form a separate drivetrain 52 to drive the feed device 5. The drivetrain 52 is arranged or positioned above the main drive belt 15 and lies substantially parallel thereto in a common vertical plane. The prop shafts 24 and the gearbox 24a are therefore also arranged or positioned substantially parallel to the main drive belt 15 and lie in a vertical plane thereto. The drivetrain 52 may be arranged or positioned differently from an arrangement that is precisely parallel and only lies within a vertical plane. Accordingly, the drivetrain 52 may also include an additional angle transverse to the driving direction FR. The arrangement of the separate drivetrain 52, comprising (or consisting of) a hydraulic motor 22, gearbox 23 and at least the prop shafts 24, is substantially within the belt width of the main drive belt 15 and runs above the main drive belt 15, or the pulley 17. This frees up installation space with respect to the overall width of the harvester 1 (or the forage harvester 2), thereby helping to enlarge the working width or working space of the working units.

On the opposite right machine side MR, components of the drive system 50 are arranged or positioned with which the attachment 4 and the conditioning apparatus 7 are driven. To drive the conditioning apparatus 7, a belt drive 25 is provided that includes another belt drive arranged or positioned on the shaft 8b. To drive the attachment 4, a separate drivetrain 53 is provided. The separate drivetrain 53 for driving the attachment 4 includes a gearbox clutch unit 26 arranged or positioned on the right machine side MR. The gearbox clutch unit 26 is driven by at least one hydraulic motor 27 that may be driven by another hydraulic pump 14a connected directly to the transfer case 11. The gearbox clutch unit 26 may also be driven by the cutter drum shaft 6b. In one or some embodiments, the gearbox clutch unit 26 is mounted on the cutter drum shaft 6b. The gearbox clutch unit 26 drives a transverse shaft 28 which runs axially parallel to the Cutter drum shaft 6b and is comprised by the separate drivetrain 53. In this regard, the gearbox clutch unit 26 drives a transverse shaft 28, which is included in the separate drivetrain 53, and runs axially parallel to the Cutter drum shaft 6b. The transverse shaft 28 is drivingly connected to a clutch apparatus 29 located on the side of the main pulley 16 (e.g., left machine side ML), and is comprised by (or included in) the separate drivetrain 53, for driving the attachment 4. The transverse shaft 28 runs through the feed housing 5c of the feed device 5.

The design and function of the gearbox clutch unit 26 is further explained below with reference to FIG. 3 and FIG. 4.

Figure 3:
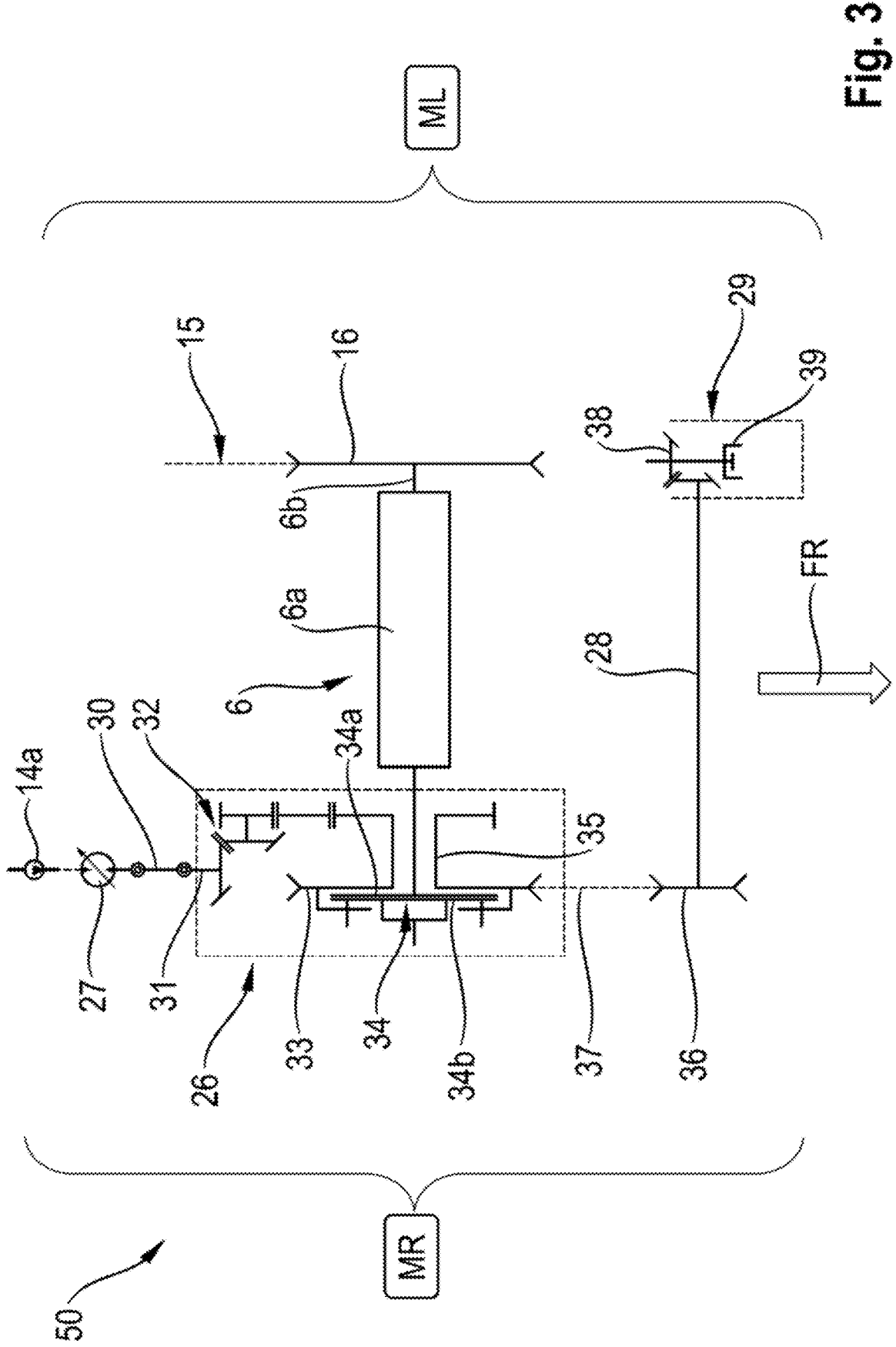
FIG. 3 shows a simplified drive schematic of the drive system.

The depiction in FIG. 3 shows a simplified drive schematic of the drive system 50. The simplified drive schematic only shows the components needed to drive the attachment 4. In one or some embodiments, the gearbox clutch unit 26 is configured to drive the attachment 4 hydraulically in a stepless manner or with discrete, power-summed transmission. The hydraulic motor 27 driven by the hydraulic pump 14a may be connected by a double joint 30 to an input shaft 31 of the gearbox clutch unit 26. The gearbox clutch unit 26 has a gear assembly 32 as well as a drive pulley 33 with a clutch 34 integrated in the drive pulley 33. The gear assembly 32 may be designed as an angular spur gear. With the gear assembly 32, the rotational speed of the hydraulic motor 27 is modified or adjusted so that the hydraulic motor 27 works within an efficient operating range.

The hydraulic motor 27 drives the gear assembly 32 using the input shaft 31. The drive pulley 33 with the clutch 34 integrated therein is arranged or positioned on the output shaft 35 of the gear assembly 32. The gear assembly 32 is mounted on the cutter drum shaft 6b. To accomplish this, the output shaft 35 is mounted relative to the cutter drum shaft 6b so as to rotate thereupon. Since the gear assembly 32 is rotatably mounted on the cutter drum shaft 6b, there is no change in angle or length while swinging the attachment 4 that would normally need to be accommodated by hose lines or a prop shaft.

The clutch 34, which may be designed as a friction clutch, has a first clutch part 34a that is connected to the cutter drum shaft 6b in a form-fit, and a second clutch part 34b that moves relative to the Cutter drum shaft 6b and is connected in a form-fit to the drive pulley 33. The two clutch parts 34a, 34b may be actuated by applying hydraulic pressure in order to connect them with each other in a friction lock. The clutch 34, which may be designed as a friction clutch, has the advantage that it works with little noise and wear. The clutch 34, which may be designed as a friction clutch, may be a single plate dry clutch. Instead of the hydraulically actuated clutch 34, it is contemplated to use a pneumatically or electromechanically actuatable clutch.

An output pulley 36 is arranged or positioned on the end of the transverse shaft 28 on its shaft end on the right machine side MR and is connected by a belt 37 to the drive pulley 33 of the gearbox clutch unit 26. The belt 37 may be pretensioned by a tensioning device 40 with changeable tension.

In one or some embodiments, the tensioning device 40 comprises a tensioning roller 41 to which force may be applied using a hydraulic cylinder 42 and which is pressed against the belt 37.

The clutch apparatus 29 is arranged or positioned on the opposite shaft end of the transverse shaft 28 on the left machine side ML. The clutch apparatus 29 includes an input gear 38 with a bevel gear stage and a quick coupling 39 to which the attachment 4 is connected in order to drive it. The input gear 38 located on the side of the main pulley 16 (e.g., the left machine side ML), connects the transverse shaft 28 to the quick coupling 39 of the clutch apparatus 29.

For the stepless drive of the attachment 4, the hydraulically actuatable clutch 34 is in a shift position in which the two clutch parts 34a, 34b are disengaged (e.g., the clutch 34 is open). When the clutch 34 is open, the gearbox clutch unit 26 may be operated in a mode with a variable rotational speed so that the attachment 4 is driven by the at least one hydraulic motor 27.

By controlling the rotational speed that is output by the at least one hydraulic motor 27, the attachment 4 may in turn be driven with a variable rotational speed.

To operate the gearbox clutch unit 26 in a power summing mode, the clutch 34 is closed. The two clutch parts 34a, 34b may therefore be frictionally engaged with each other so that the attachment 4 is mechanically driven using the cutter drum shaft 6b driven by the main drive belt 15 and by the at least one hydraulic motor 27. In so doing, the power emitted by the hydraulic motor 27 may be minimized to reduce the power loss. A power summing operation may be used for all types of attachments. In particular, a power summing operation may be used for attachments 4 designed as corn pickers or direct cutting units since the rotational speed is constant in this type of operation.

Moreover, the gearbox clutch unit 26 may be operated in a reverse mode in which the clutch 34 is opened and the rotational direction of the at least one hydraulic motor 27 is inverted. In this manner, problems with the flow of material within the feed device 5 and/or the attachment 4 may be overcome by driving them in reverse. This also inverts the direction of rotation of the hydraulic motor 22 that drives the feed device 5. The directions of rotation of the two hydraulic motors 22 and 27 are inverted independent of each other. Accordingly, the feed device 5 and the attachment 4 may also be individually reversed independently of each other.

The braking and acceleration of the attachment 4 may be accomplished hydraulically, wherein in so doing, the clutch 34 is open. At least one of the hydraulic pumps 14, 14a connected to the main drivetrain 51 may be used for braking By opening the clutch 13, the drivetrain is interrupted between the drive motor 9 and the transfer case 11. The power transmitted by the main drive belt 15 to the transfer case 11 of the still-rotating working units may be absorbed by at least by one of the hydraulic pumps 14, 14a so that the working units come to a standstill within seconds.

A first pressure may be applied to the hydraulic cylinder 42 of the tensioning device 40 in the mode with a variable rotational speed and in the power summing mode of the gearbox clutch unit 26, whereas a second pressure greater than the first pressure may be applied to the hydraulic cylinder 42 in reverse mode or during a braking process in which the slack strand and tight strand of the belt 37 change. With the tensioning device 40 assigned to the gearbox clutch unit 26, the torque may be reliably transmitted even in the instance in which thrust reverses. The hydraulic pressure, with which the hydraulic cylinders 21 and 42 of the tensioning devices 18 and 40 is supplied, may be provided by a pressure source of the self-propelling harvester 1 or the forage harvester 2.

Figure 4:
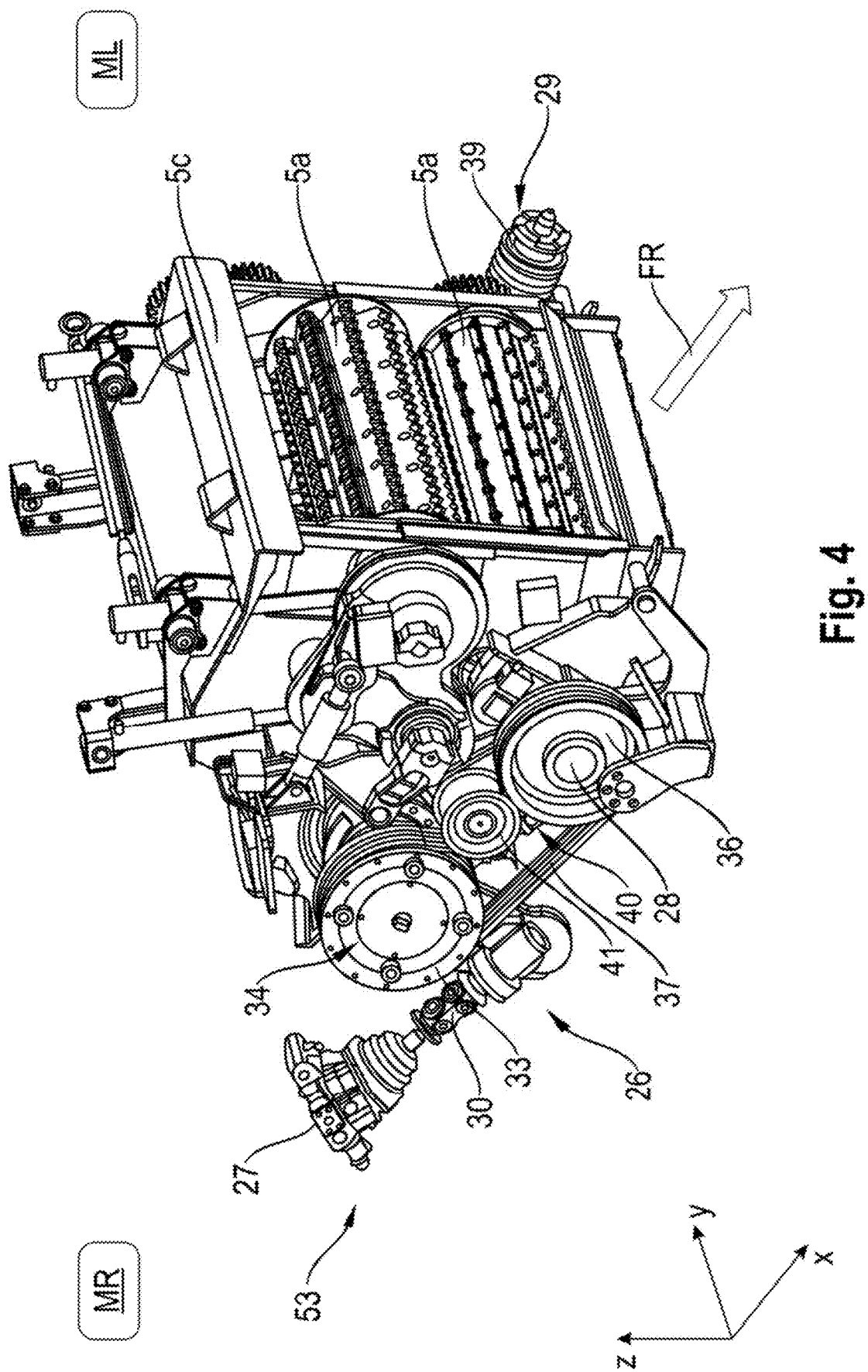
FIG. 4 schematically shows a perspective view of a feed device with a clutch gearbox unit arranged or positioned thereupon.

FIG. 4 schematically shows a perspective view of the feed device 5 with the gearbox clutch unit 26 arranged or positioned on the right machine side MR, the tensioning device 40, the output pulley 36, and the belt 37. The clutch apparatus 29, with the quick coupling 39 on the end, is shown on the left machine side ML.

Figure 5:
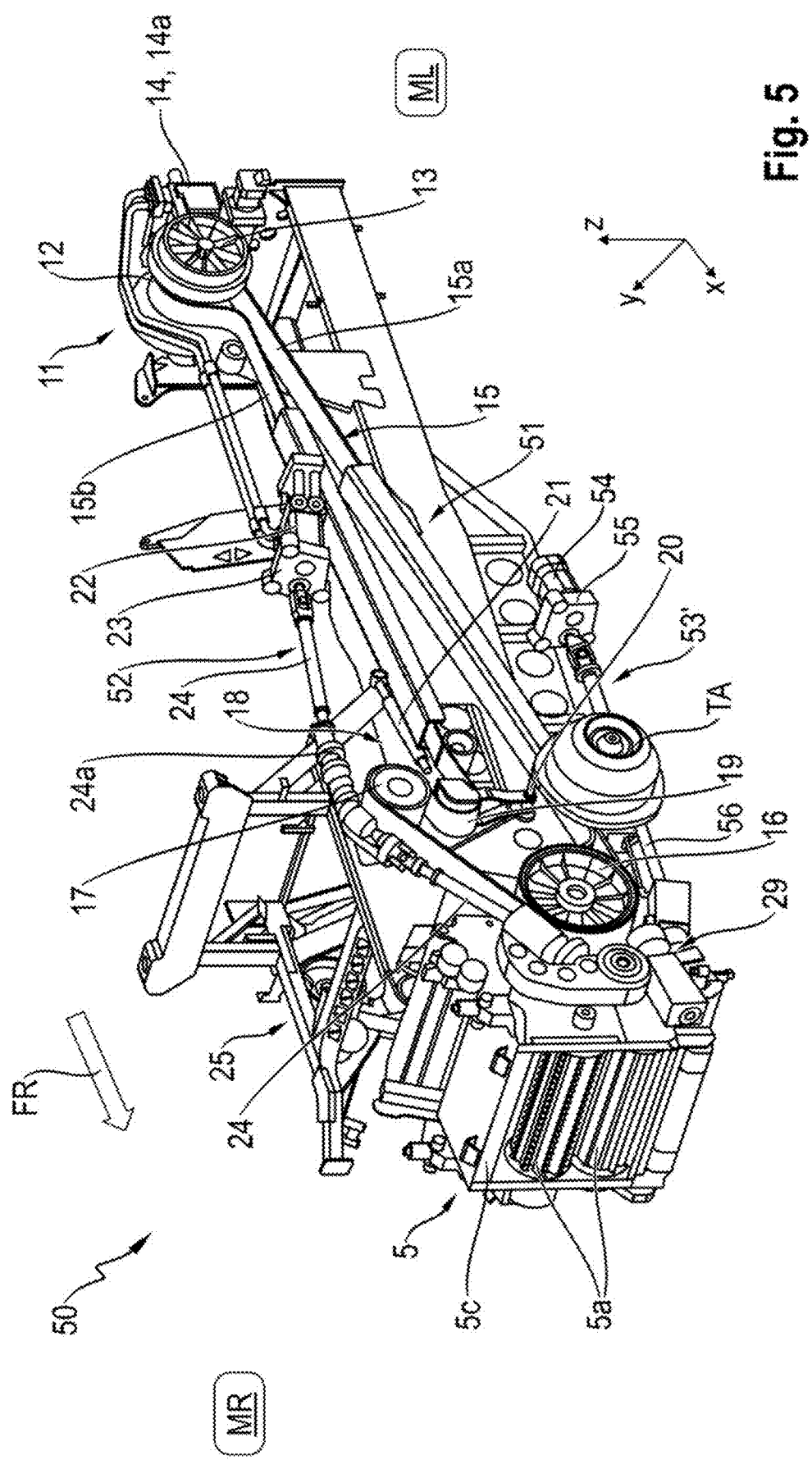
FIG. 5 shows a schematic, perspective view of a drive system for a self-propelling harvester according to a second embodiment.
Figure 6:
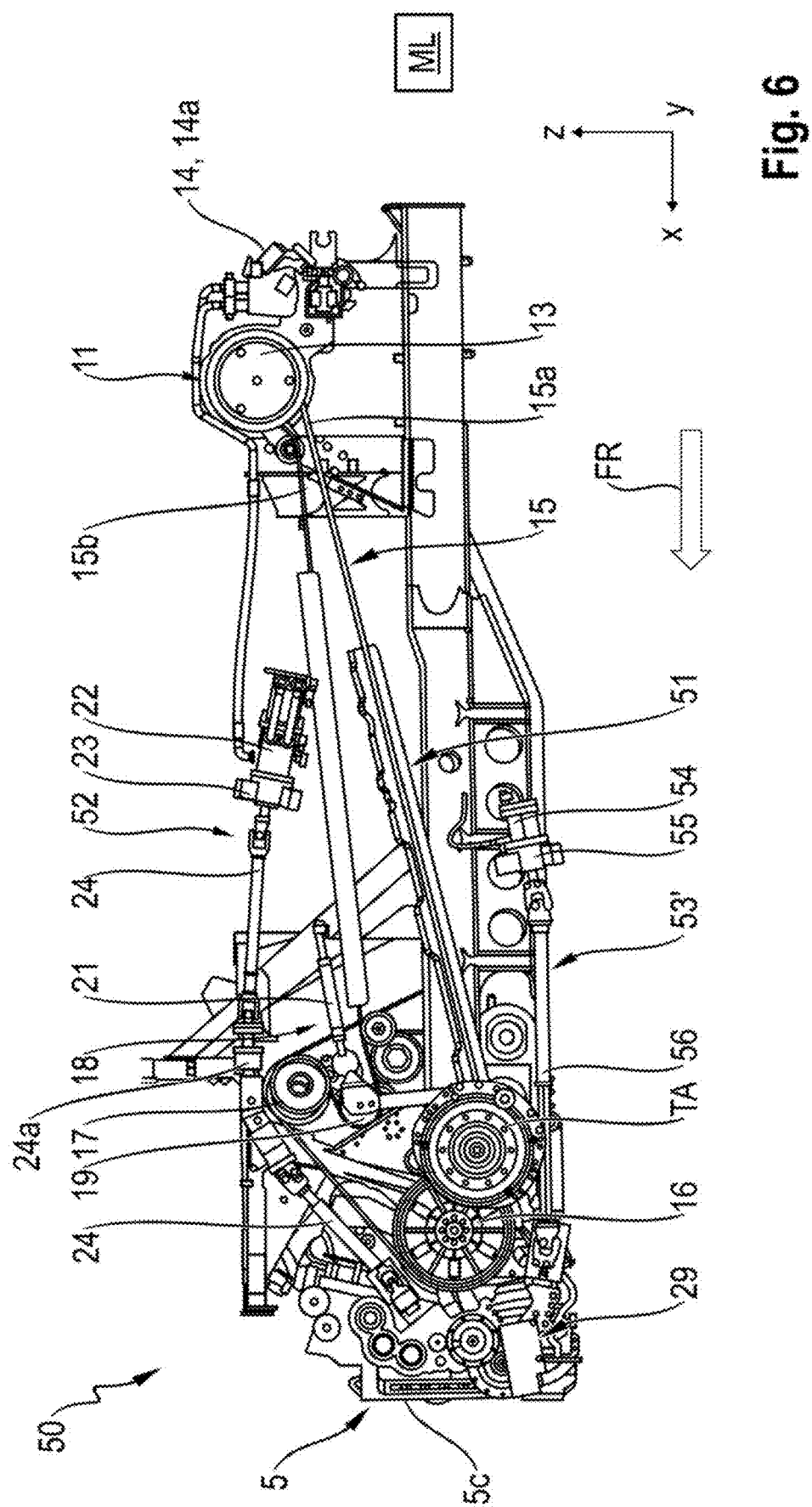
FIG. 6 shows a side view of a left machine side of the harvester according to FIG. 5.

FIG. 5 shows a schematic, perspective view of a drive system for a self-propelling harvester according to a second embodiment, and FIG. 6 shows a side view of the left machine side ML of the harvester 1 according to FIG. 5. The reference numbers that were already used for the description of FIGS. 1-4 are used for identical components of the drive system 50.

In contrast to the drive system 50 according to the first embodiment, a separate drivetrain 53' is provided instead of the drivetrain 53 for driving the attachment 4 and is also arranged or positioned on the left machine side ML of the forage harvester 2. The separate drivetrain 53' includes a hydraulic motor 54, a gearbox 55, and at least one prop shaft 56 that is drivably connected to the clutch apparatus 29 for driving the attachment 4. The hydraulic motor 54 may be fed from the hydraulic pump 14a.

The separate drivetrain 53' is arranged or positioned lying in the common vertical plane with the main drive belt 15. Whereas the separate drivetrain 52 for driving the feed device 5 is arranged or positioned above the main drive belt 15, the separate drivetrain 53' runs below the main drive belt 15. In particular, the at least one prop shaft 56 of the separate drivetrain 53' is arranged or positioned below the drive axle TA. The separate drivetrains 52 and 53' for driving the attachment 4 and the feed device 5 are arranged or positioned lying substantially within the belt width of the main drive belt 15.

This concept underlying the second embodiment may also be driven at a constant speed for high performances. In this case, the belt drive of the cutter drum 6a may also be used therefor on the right machine side MR. The design difference is either the arrangement of the gearbox clutch unit 26 on the right machine side MR as described above, or the arrangement of the prop shaft 56 of the separate drivetrain 53' of the attachment 4 below the main drive belt 15 on the left machine side. Both embodiments use the belt drive on the left machine side ML for operating the attachment 4 with a constant rotational speed.

It is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another.

LIST OF REFERENCE NUMBERS

| | |
|---|---|
| 1 | Harvester |
| 2 | Forage harvester |
| 3 | Harvested material |
| 4 | Attachment |
| 5 | Feed device |
| 5a | First roller pair |
| 5b | Second roller pair |
| 5c | Feed housing |
| 6 | Chopping device |
| 6a | Cutter drum |
| 6b | Cutter drum shaft |
| 7 | Conditioning apparatus |
| 8 | Ejection accelerator |
| 8a | Conveying elements |
| 8b | Shaft |
| 9 | Drive motor |
| 10 | Transfer apparatus |
| 11 | Transfer case |
| 12 | Output pulley |
| 13 | Clutch |
| 14 | Hydraulic pump |
| 14a | Hydraulic pump |
| 15 | Main drive belt |
| 15a | Bottom side of 15 |
| 15b | Top side of 15 |
| 16 | Main pulley |
| 17 | Pulley |
| 18 | Clamping device |
| 19 | Belt tensioner |
| 20 | Axle |
| 21 | Hydraulic cylinder |
| 22 | Hydraulic motor |
| 23 | Gearbox |
| 24 | Prop shaft |
| 24a | Gearbox |
| 25 | Belt drive |
| 26 | Gearbox clutch unit |
| 27 | Hydraulic motor |
| 28 | Transverse shaft |
| 29 | Clutch apparatus |
| 30 | Double joint |
| 31 | Input shaft |
| 32 | Gear assembly |
| 33 | Drive pulley |
| 34 | Clutch |
| 34a | First clutch part |
| 34b | Second clutch part |
| 35 | Output shaft |
| 36 | Output pulley |
| 37 | Belt |
| 38 | Input gear |
| 39 | Quick coupling |
| 40 | Clamping device |
| 41 | Belt tensioner |
| 42 | Hydraulic cylinder |
| 50 | Drive system |
| 51 | Main drivetrain |
| 52 | Drivetrain of 5 |
| 53 | Drivetrain of 4 |
| 53' | Drivetrain of 4 |
| 54 | Hydraulic motor |
| 55 | Gearbox |
| 56 | Prop shaft |
| FR | Direction of travel |
| ML | Left machine side |
| MR | Right machine side |
| 57 | Arrow |

What is claimed is:

1. A drive system for self-propelling harvester, the drive system comprising:
a drive motor;
a transfer case configured to be driven by the drive motor, the transfer case having an output pulley positioned on a driveshaft of the transfer case and configured to drive, using a main drive belt, at least one main pulley of a rotating cutter drum positioned on an end of a cutter drum shaft, a conditioning apparatus, and an ejection accelerator; and
at least one hydraulic pump driven by the drive motor for hydraulically driving at least one of an attachment or a feed device;
wherein a main drivetrain is formed by the output pulley, the main drive belt and the main pulley and configured to drive the cutter drum, the conditioning apparatus, and the ejection accelerator;
wherein at least one separate drivetrain, comprising at least one prop shaft, is configured to drive at least one of the attachment or the feed device;
wherein the at least one prop shaft is positioned to at least partly lie in a common vertical plane with the main drive belt;
wherein the at least one separate drivetrain is positioned to lie in a common vertical plane with the main drive belt; and where the at least one separate drivetrain is positioned substantially within a belt width of the main drive belt.

2. The drive system of claim 1, wherein the at least one separate drivetrain comprises a first separate drivetrain and a second separate drivetrain; and
wherein the first separate drivetrain and the second separate drivetrain are positioned to lie substantially within a belt width of the main drive belt.

3. The drive system of claim 2, wherein the first separate drivetrain is configured to drive the attachment and is positioned to lie underneath the main drive belt; and
wherein the second separate drivetrain is configured to drive the feed device and is positioned to lie above the main drive belt.

4. The drive system of claim 3, wherein the first separate drivetrain configured to drive the attachment is positioned to:
lie axially to a drive axle of the harvester; or
at least extend sectionally through an axle beam of the drive axle.

5. The drive system of claim 3, wherein the first separate drivetrain configured to drive the attachment is positioned to lie axially to a drive axle of the harvester.

6. The drive system of claim 1, wherein the at least one prop shaft is positioned on a side of the main drivetrain.

7. The drive system of claim 1, wherein the at least one separate drivetrain further includes a pump that is driven directly by the transfer case.

8. The drive system of claim 1, wherein the at least one separate drivetrain is configured to drive the attachment and is positioned to lie underneath the main drive belt.

9. The drive system of claim 1, wherein the at least one separate drivetrain is positioned to lie axially to a drive axle of the harvester so that the at least one separate drivetrain is positioned underneath or above the drive axle.

10. The drive system of claim 1, wherein the at least one separate drivetrain configured to drive the feed device and is positioned to lie above the main drive belt.

11. The drive system of claim 1, wherein the at least one separate drivetrain is positioned to lie axially to a drive axle of the harvester so that the at least one separate drivetrain is positioned underneath or above the drive axle.

12. A drive system for self-propelling harvester, the drive system comprising:
a drive motor;
a transfer case configured to be driven by the drive motor, the transfer case having an output pulley positioned on a driveshaft of the transfer case and configured to drive, using a main drive belt, at least one main pulley of a rotating cutter drum positioned on an end of a cutter drum shaft, a conditioning apparatus, and an ejection accelerator; and
at least one hydraulic pump driven by the drive motor for hydraulically driving at least one of an attachment or a feed device;
wherein a main drivetrain is formed by the output pulley, the main drive belt and the main pulley and configured to drive the cutter drum, the conditioning apparatus, and the ejection accelerator;
wherein at least one separate drivetrain, comprising at least one prop shaft, is configured to drive at least one of the attachment or the feed device;
wherein the at least one prop shaft is positioned to at least partly lie in a common vertical plane with the main drive belt;
wherein the at least one separate drivetrain is configured to drive the attachment, the at least one separate drivetrain includes a gearbox clutch unit that is assigned to the end of the cutter drum shaft on a side opposite the main pulley;
wherein the gearbox clutch unit is configured to steplessly hydraulically drive the attachment or with power summing with a discrete transmission;
wherein the gearbox clutch unit is configured to drive a transverse shaft running axially parallel to the cutter drum shaft; and
wherein the transverse shaft is drivingly connected to a clutch apparatus located on a side of the at least one main pulley in order to drive the attachment.

13. The drive system of claim 12, wherein the gearbox clutch unit includes a gear assembly and a drive pulley with a clutch integrated in the drive pulley.

14. The drive system of claim 13, wherein the gear assembly is rotatably mounted on the cutter drum shaft such that there is no change in angle or length while swinging the attachment.

15. The drive system of claim 13, wherein an output pulley is positioned on an end of the transverse shaft and is connected by a belt to the drive pulley of the gearbox clutch unit.

16. A self-propelling harvester comprising:
at least one working unit; and
a drive system configured to transmit force to the at least one working unit, the drive system comprising:
a drive motor;
a transfer case configured to be driven by the drive motor, the transfer case having an output pulley positioned on a driveshaft of the transfer case and configured to drive, using a main drive belt, at least one main pulley of a rotating cutter drum positioned on the end of a cutter drum shaft, a conditioning apparatus, and an ejection accelerator; and
at least one hydraulic pump driven by the drive motor for hydraulically driving at least one of an attachment or a feed device;
wherein a main drivetrain is formed by the output pulley, the main drive belt and the main pulley and configured to drive the cutter drum, the conditioning apparatus, and the ejection accelerator;
wherein at least one separate drivetrain, comprising at least one prop shaft, is configured to drive at least one of the attachment or the feed device;
wherein the at least one prop shaft is positioned to at least partly lie in a common vertical plane with the main drive belt;
wherein the at least one separate drivetrain is positioned to lie in a common vertical plane with the main drive belt; and
where the at least one separate drivetrain is positioned substantially within a belt width of the main drive belt.

17. The self-propelling harvester of claim 16, wherein a first separate drivetrain and a second separate drivetrain are positioned to lie substantially within a belt width of the main drive belt.

* * * * *